Sept. 26, 1933.   A. J. WHITCOMB   1,928,039
BLAST FURNACE CHARGING SYSTEM
Filed July 22, 1929   3 Sheets-Sheet 1

Inventor:
Arthur J. Whitcomb

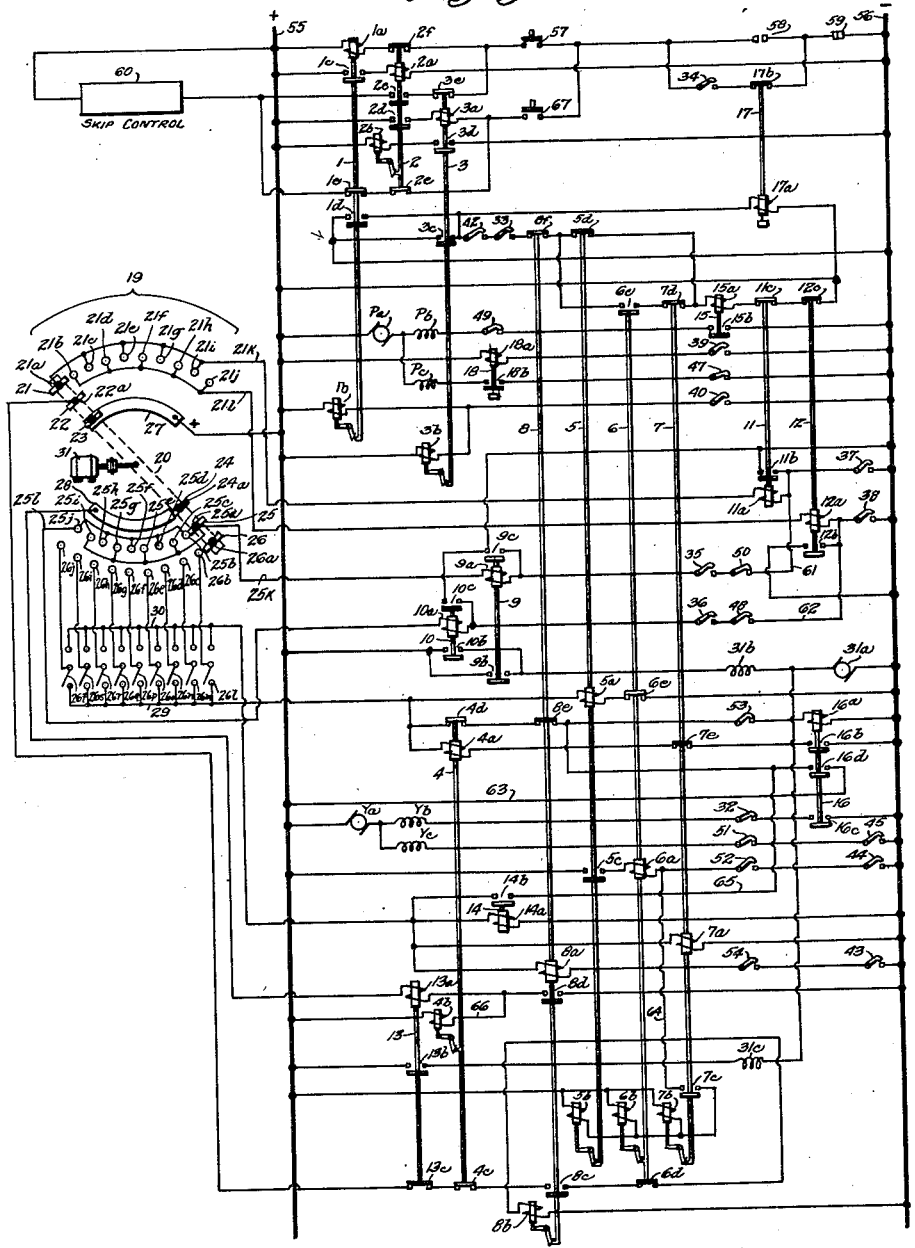

Sept. 26, 1933.     A. J. WHITCOMB     1,928,039

BLAST FURNACE CHARGING SYSTEM

Filed July 22, 1929     3 Sheets—Sheet 3

*Fig. 3*

| LATCH RELAY NOS. | RELAY NOS. | SKIP MASTER IN UP POSITION | SMALL BELL ½ OPEN | SMALL BELL FULL OPEN | SMALL BELL ½ SHUT | SMALL BELL SHUT | SKIP MASTER IN DOWN POSITION | SMALL BELL ½ OPEN | SMALL BELL FULL OPEN | SMALL BELL ½ SHUT | SMALL BELL SHUT | LARGE BELL OPEN | LARGE BELL ½ SHUT | LARGE BELL SHUT | SKIP MASTER IN UP POSITION | SMALL BELL ½ OPEN | SMALL BELL FULL OPEN | SMALL BELL ½ SHUT | SMALL BELL SHUT | LARGE BELL ½ OPEN | LARGE BELL FULL OPEN | LARGE BELL ½ SHUT | LARGE BELL SHUT |
|---|---|---|---|---|---|---|---|---|---|---|---|---|---|---|---|---|---|---|---|---|---|---|---|
| 1 | — | X | X | O | • | • | • | • | • | • | • | • | • | • | • | X | X | O | • | • | • | • | • | • |
| 2 | — | X | X | X | X | X | O | • | • | • | • | • | • | • | • | X | X | X | X | X | X | X | X | X |
| 3 | — | • | • | • | • | • | X | X | O | • | • | • | • | • | • | • | • | • | • | • | • | • | • | • |
| 4 | — | • | • | • | • | • | • | • | • | • | • | X | X | X | X | X | X | X | X | X | X | O | • | • |
| 5 | — | • | • | • | • | • | • | • | • | • | • | X | X | X | X | X | X | X | X | X | X | X | O | • |
| 6 | — | • | • | • | • | • | • | • | • | • | • | • | X | X | X | X | X | X | X | X | X | X | O | • |
| 7 | — | • | • | • | • | • | • | • | • | • | • | • | • | • | • | • | • | • | • | • | X | X | X | O |
| 8 | — | • | • | • | • | • | • | • | • | • | • | • | • | • | • | • | • | • | • | • | • | X | X | O |
| — | 9 | • | • | • | XO | • | • | • | • | • | • | • | • | • | • | • | • | • | XO | • | • | • | • | • |
| — | 10 | • | • | • | • | • | • | • | • | XO | • | • | • | • | • | • | • | • | • | • | • | • | • | • |
| — | 11 | • | X | X | O | • | • | • | • | • | • | • | • | • | • | X | X | O | • | • | • | • | • | • |
| — | 12 | • | • | • | • | • | • | X | X | O | • | • | • | • | • | • | • | • | • | • | • | • | • | • |
| — | 13 | • | • | • | • | • | • | • | • | • | • | • | • | • | • | • | • | • | • | • | X | O | • | • |
| — | 14 | • | • | • | • | • | • | • | • | • | • | • | • | • | • | • | • | • | • | X | O | • | • | • |
| — | 15 | XO | • | • | • | • | XO | • | • | • | • | • | • | • | • | XO | • | • | • | • | • | • | • | • |
| — | 16 | • | • | • | • | • | • | • | • | • | • | XO | • | • | • | • | • | • | • | XO | • | • | • | • |
| — | 17 | X | X | O | • | • | X | X | O | • | • | • | • | • | • | • | • | • | • | • | • | • | • | • |
| — | 18 | • | • | XO | • | • | • | • | XO | • | • | • | • | • | • | • | • | • | • | • | • | • | • | • |
| | 19 | | | * | | | | | * | | | | * | | | | | * | | | | + | | |

X = RELAY CLOSES    * FACE PLATE CONTACT MOVES 1 BUTTON
O = RELAY OPENS    + FACE PLATE CONTACT GOES BACK TO 0
• = RELAY OPEN

*Inventor:*
*Arthur J. Whitcomb*
By Wilkinson, Huxley, Byron & Knight Attys

Patented Sept. 26, 1933

1,928,039

UNITED STATES PATENT OFFICE 1,928,039

BLAST FURNACE CHARGING SYSTEM

Arthur J. Whitcomb, Chicago, Ill., assignor to Freyn Engineering Company, Chicago, Ill., a corporation of Maine Application July 22, 1929. Serial No. 379,969

11 Claims. (Cl. 254—178)

The present invention relates to blast furnace charging systems.

More particularly the present invention relates to a control system for charging a blast furnace or the like in which the various instrumentalities employed in charging said blast furnace or the like are controlled to operate in a predetermined sequence. It is common practice to provide a blast furnace with two charging bells, commonly termed the large bell and the small bell; or equivalent means may be used instead of one or the other or both of said bells. It is also common practice to provide a skip, or a pair of skips, for lifting material to the top of the blast furnace, which skip or skips are dumped at the upper region of travel. It is also common practice to provide a distributing device for distributing the material dumped from the skip or skips. It is also common practice to charge material upon the small bell or its equivalent, and to dump each charge before the large bell is opened to allow said material to fall into the furnace. In order to avoid losses, the large bell should be closed when the small bell is open, and, conversely, the small bell should be closed when the large bell is open. The present invention contemplates the utilization of means for interrelating the actions of the elements referred to, and contemplates a control system to that end.

An object of the present invention is to provide an improved blast furnace charging system involving such instrumentalities as have been mentioned above, or their equivalents, which system will have interlocking means whereby part or all of the following advantages may be had: to prevent operation of the skip or skips and the small bell while the distributing means is in motion; to prevent either of the skips from dumping upon the open small bell; to cause the small bell to open automatically at the time either of the skips is started on its upward trip by the operator; to prevent the next succeeding trip of a skip unless the small bell has been fully opened to dump the previous charge; to cause the small bell to open, to remain open for a set interval, and to close, which operation is dependent upon the operation of the skip or skips; to cause a predetermined sequence for the purpose of causing the large bell to open after a predetermined variable number of dumps of the small bell in one portion of a charging round and causing the large bell to open after a predetermined variable number of dumps of the small bell in another portion of the charging round, which predetermined number of dumps in one of said portions of a round may be different from the number in said other portion of said round; to allow the number of dumps of the small bell before the large bell operates to be readily varied at the will of the operator; to interlock the operation of the large and small bells whereby the small bell is prevented from operating (after the sequence control has started the large bell control to function) unless and until the large bell has completed its operations; to prevent the small bell from operating in the event that the large bell does not function completely and to stop the skip mechanism and to prevent the dumping of a further charge upon the small bell in the event that the large bell does not function completely; and to cause the large bell to function to open and close in response to a predetermined number of operations of the small bell, which predetermined number may be readily varied at the will of the operator.

A further object of the present invention is to provide a blast furnace charging system which is well adapted to meet the needs of commercial operation and which will enable an operator to charge a blast furnace in a minimum of time.

A further object is to provide a blast furnace charging system utilizing instrumentalities which are relatively inexpensive and which occupy a minimum of space, which will not only cut down the labor incident to charging, but which will enable the operator in a minimum of time to provide a desired distribution of the various materials within the blast furnace.

Further objects will appear as the description proceeds.

The present invention constitutes an improvement over the invention described in application Serial No. 205,400, filed July 13, 1927, by the present applicants.

Referring to the drawings—

Figure 2 is a wiring diagram illustrating diagrammatically the electric control system involved in the layout shown in Figure 1; and Figure 3 is a schedule reciting a typical round of operation of the small and large bells.

Figure 1:
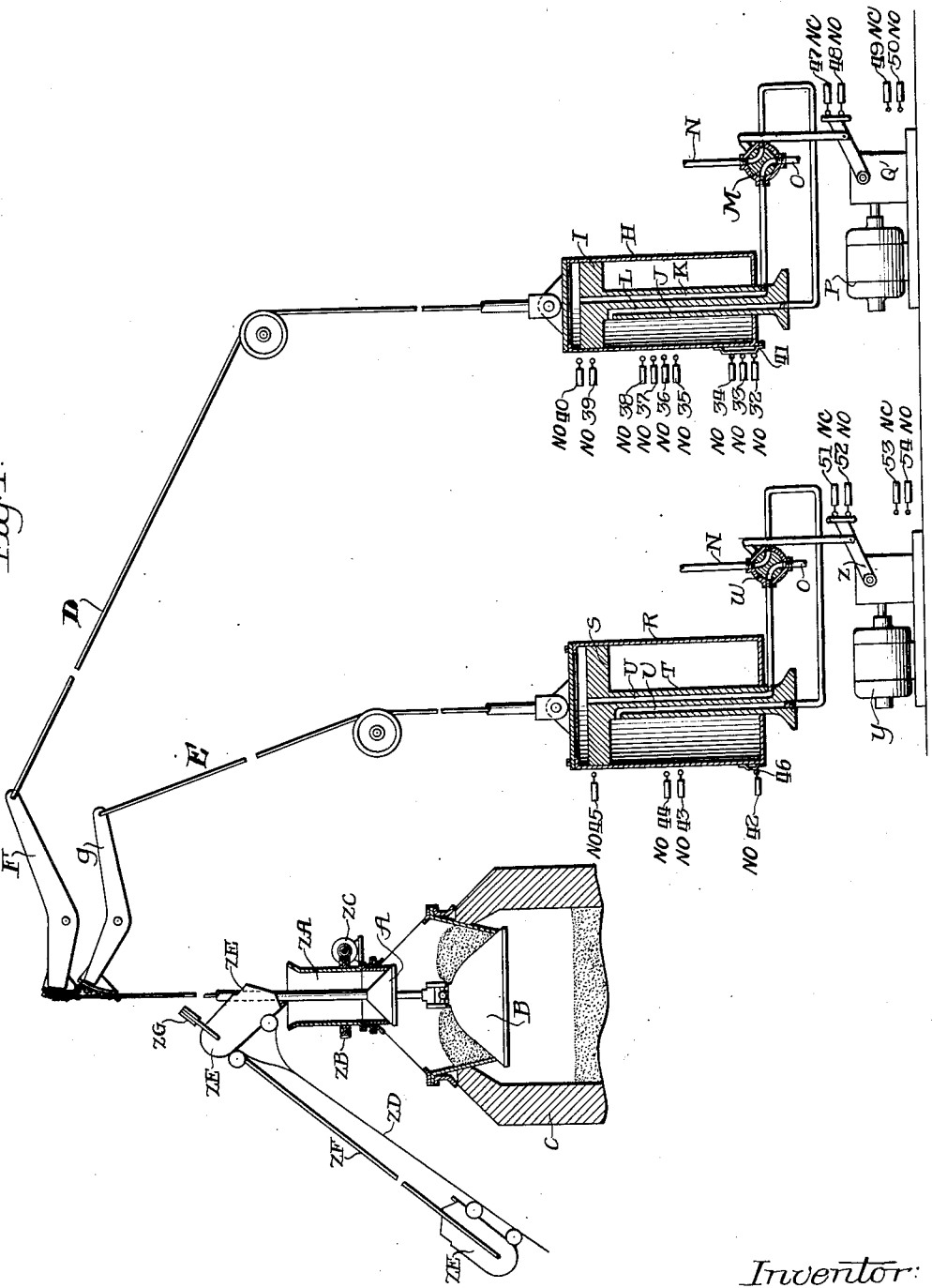
Figure 1 is a view, more or less diagrammatic, illustrating a blast furnace charging system embodying the principles of the present invention.

A description of the present invention may be prefaced by a statement of the preferred cycle of operation.

Cycle of operation

A preferred cycle of operation is as follows. The system of control embodied in the present invention provides for automatic dumping of the small and large bells of a blast furnace according to a specified round that may be varied as desired. As shown in the accompanying drawings, provision is made for as many as ten dumps of the small bell for each dump of the large bell. It will be understood, of course, that if a larger number of dumps of the small bell is desired, this result can be attained by adding more contact buttons and a corresponding increased number of simple double throw switches. For the purpose of this explanation it may be assumed that said double throw switches have been disposed so that a round will consist of two dumps of the small bell followed by a dump of the large bell, after which one more dump is made by the small bell followed by a dump of the large bell. This round, though simple, may be considered typical and is used for the purpose of explanation. The possibility of predetermining the number of dumps of the small bell prior to the dumping of the large bell has decided advantages in commercial operation, inasmuch as it allows the charging of a predetermined mixture with a minimum number of trips of the skip hoist. The proportions of coke, ore and stone will, of course, vary under varying conditions. Under certain conditions it may be considered best to charge a load of coke, a mixed load of ore and stone and another load of coke upon the large bell before dumping, after which another load of mixed ore and stone and a load of coke will be deposited upon the large bell, followed by the dumping of the large bell. Under other conditions it may be preferred to have four dumps of the small bell, followed by the dumping of the large bell, after which it is desired to have three dumps of the small bell followed by a dumping of the large bell. A typical round under the conditions just mentioned may be two loads of ore and two loads of coke, followed by the dumping of the large bell, and one load of ore, one load of stone and one load of coke, followed by the dumping of the large bell. These examples are, of course, not to be considered in a limiting sense in any respect, but are cited merely in explanation of the advantage of allowing ready selectability of the sequence of action of the large and small bells.

A description of the sequence of operation for a round is as follows. The scale car operator will throw the skip master switch so as to send up the proper skip, that is—the skip which is at the lower level at that particular time. If the revolving distributor means cooperating with the small bell is motionless, the "revolving distributor and slow-down interlocking means" will permit the skip control to function and the skip will be sent on its way to the top of the furnace. If said revolving distributor is in motion, the skip is automatically held at the bottom of its incline until such time as the distributor has stopped, whereupon the skip then goes up the incline automatically.

At the same time that the skip starts upwardly the "skip interlocking means" is caused to function, which in turn starts the small bell control and causes the small bell to open and close in a predetermined cycle, which preferably includes a period of dwell to permit the load upon said small bell to completely drop away from said small bell. The small bell in normal operation opens and closes in less time than it takes the skip to go to the top of the incline. Hence, when the skip arrives at the dumping point, the small bell is closed and its hopper is empty, ready to receive the charge from the skip. Slow-down means are provided near the upper limit of travel of each skip, and according to the present invention provision is made for stopping the skip at the slow-down point should the small bell not be closed at the time at which the skip arrives at this point. However, according to the present invention, as soon as the small bell is closed, the skip is automatically carried to the upper limit of its travel and automatically dumped.

Should the small bell fail to dump at any time, provision is made through the "skip interlocking means" for holding the upgoing skip at the slow-down point until such time as the small bell is made to dump, whereupon the skip mechanism automatically resumes its cycle. Hence, the small bell is forced to dump for each load the skip mechanism delivers to it, and the interlocking is such as to prevent the possibility of the small bell receiving two or more loads before dumping. Provision is also made for insuring that the large bell is closed before the small bell can open.

As has been stated above, the small bell is caused to dump after each dump of a skipload of material upon said small bell. Each dumping of the small bell initiates the functioning of the "sequence control". When a predetermined number of skiploads (which predetermined number may be varied at the will of the operator) have been sent up, the "sequence control" actuates the large bell control to cause the large bell to dump.

Provision is also made so that the large bell cannot dump until the small bell is closed. By means of the bell interlocking, provision is made for preventing the small bell from opearating until such time as the large bell has dumped. Hence, when the predetermined number of dumps of the small bell have been made, the large bell must dump, or else the small bell is prevented from dumping. If the small bell does not dump, the upgoing skip cannot get past the slow-down point. Consequently, the operations of the skip, the small bell and the large bell are not only sequenced, but also are interlocked, so that if one of said instrumentalities does not function properly, operation of the system is stopped. After the dumping of the large bell as above described, the skip mechanism again operates. According to the example above taken, one skipload is sent up, after which the sequence control functions to cause the large bell to dump. These operations are also interlocked in the same manner as described for the operations in the first part of a round. These operations complete the desired round described at the beginning of the cycle of operation. The sequence control means, skip interlocking means and bell interlocking means automatically reset themselves for the beginning of the next round, during which the described cycle is repeated.

Description of instrumentalities

Referring now to Figure 1, a system is disclosed wherein counterweighted bell operating cylinders are connected directly with cables leading to bell levers connected with the large and small bells of the blast furnace. It is the function of each of said cylinders to hoist its corresponding counterweight, thereby permitting the corresponding bell to open by gravity. The drawings illustrate simple mechanism for controlling each of said cylinders, which mechanism includes automatically controlled valve mechanism for selectably connecting the corresponding cylinder to a source of fluid pressure or to an exhaust. The speed of movement of each cylinder (and its corresponding bell) may be controlled by controlling the exhaust from said cylinder.

Referring to the drawings, the letter A represents one bell and the letter B indicates a second and larger bell, which cooperate with one another in the charging of the blast furnace C. The two bells A and B may be arranged coaxially in a manner which is common in practice, the bell A being controlled by a cable D, while the larger bell B is controlled by the cable E, levers F and G being connected to said cables D and E, respectively, said levers F and G being connected to the bells A and B, respectively. The cable D is connected to the hydraulic cylinder H, which is adapted to have a reciprocating movement along a vertical axis.

Disposed within the small bell cylinder H is the piston I, which piston is carried by the piston rod J. Said piston rod J and piston I are stationarily mounted. The piston rod J is provided with the port K communicating with the space above the piston I and is also provided with the port L communicating with the space below said piston I. The letter M indicates a four-way valve, which need not be described in detail, inasmuch as such valves are well known and are readily purchasable in the open market. It will be sufficient to state that when said four-way valve M is in one predetermined position, it provides communication from the fluid inlet N through port L to the space below the piston I. At the same time said valve M provides access from the port K to an exhaust O. When said four-way valve M is in another predetermined position it permits access from the fluid inlet N through the port K to the space above the piston I. At the same time it permits access from the space below the piston I to the exhaust O. Said four-way valve M is adapted to be operated by means of the motor P, which, through any preferred power transmitting mechanism, operates the crank Q. Said crank Q may be connected to said four-way valve M through any preferred mechanism. Said crank Q may also operate certain limit switches, which will be described presently.

The cable D is connected to the cylinder R, which is also adapted to have a reciprocating movement along a vertical axis. Said cylinder R is provided with the piston S carried by the piston rod T. Said piston S and piston rod T are stationarily mounted. Said piston rod T is provided with the port U, providing access to the space above said piston S. Said piston rod T is also provided with the port V, providing access to the space below said piston S. The letter W indicates a four-way valve similar in function to the four-way valve M above described. When said four-way valve is in one predetermined position, it permits access from the source of fluid pressure N to the space on the under side of the piston S, and at the same time provides access from the space above the piston S to the exhaust O. When said four-way valve W is in another predetermined position, it permits access from the source of fluid pressure N to the space above the piston S, and at the same time permits access from the space below the piston S to the exhaust O. Said four-way valve is adapted to be operated by means of the electric motor Y, which, through any preferred power transmitting mechanism, is adapted to turn the crank Z. Said crank Z is connected to the four-way valve W through any preferred connecting means, which need not be described.

Cooperatively associated with the small bell A is the rotary distributor, indicated by the character ZA, which rotary distributor may take any preferred forms, several forms being available in the open market. Said distributor ZA may be provided with the annular gear ZB, which may be driven by the motor ZC. The details of the means for driving the distributor ZA form no part of the present invention except that, as referred to above, the skip mechanism is prevented from operating unless the distributor is motionless. The electric interlock whereby this feature is had will be described hereinafter. The character ZD indicates an incline provided with the pair of skips ZE—ZE, which skips are connected to the two ends of a cable ZF, which runs over a sheave ZG disposed at a region above the blast furnace C. The incline ZD is provided with any preferred abutment means, several forms of which are available in the market, for dumping each skip ZE when it reaches the upper limit of its travel.

A number of limit switches are contemplated in the present invention, which limit switches may be operated in response to the travel of the cylinders H and R. The connections and functions of said limit switches will be referred to presently.

The present invention contemplates the use of a number of relays, which are indicated in the drawings by the numerals 1, 2, 3, 4, 5, 6, 7, 8, 9, 10, 11, 12, 13, 14, 15, 16, 17 and 18. Certain of said relays involve a plurality of switches. Moreover, certain of said relays involve a plurality of operating coils. The switches and operating coils associated with said relays will be indicated by means of suffixes. The numeral 19 indicates a controller (a face plate controller being shown in the drawings), which controller is motor driven and controls the energization of the relays above mentioned in a predetermined cycle.

The relays above referred to may be catalogued as follows:

Relay 1 comprises the operating coil 1a and the trip coil 1b. Said relay 1 also comprises the three switches 1c (biased to open position), 1d (biased to open position) and 1e (biased to closed position). Relay 1 is provided with latching means (not illustrated) for latching said relay in unbiased position after operation of the operating coil 1a. Trip coil 1b operates to unlatch said latching means. In the description which follows, relay 1 will be termed a "latch relay" to distinguish from other types of relays which are not provided with latching means. Relays 1, 2, 3, 4, 5, 6, 7 and 8 are latch relays, and relays 9, 10, 11, 12, 13, 14, 15, 16, 17 and 18 are not latch relays.

Relay 2 comprises the operating coil 2a and the trip coil 2b. Said relay also includes the switch 2c and the switch 2d, both of which are biased to open position, and the switches 2e and 2f, both of which are biased to closed position.

Relay 3 comprises the operating coil 3a and the trip coil 3b. Said relay 3 also comprises the switches 3c and 3d, both biased to open position, and the switch 3e biased to closed position.

Relay 4 comprises the operating coil 4a and the trip coil 4b. Said relay 4 also comprises the two switches 4c and 4d, both biased to closed position.

Relay 5 comprises the operating coil 5a and the trip coil 5b. Said relay 5 also comprises the switch 5c biased to open position and the switch 5d biased to closed position.

Relay 6 comprises the operating coil 6a and the trip coil 6b. Said relay 6 also comprises the switch 6c, biased to open position, and the switches 6d and 6e, biased to closed position.

Relay 7 comprises the operating coil 7a and the trip coil 7b. Said relay 7 also comprises the switch 7c, biased to open position, and the switches 7d and 7e, biased to closed positions.

Relay 8 comprises the operating coil 8a and the trip coil 8b. Said relay 8 also comprises the switches 8c and 8d, both biased to open position, and the switches 8e and 8f, both biased to closed position.

Relay 9 comprises the operating coil 9a and the switches 9b and 9c, biased to open position.

Relay 10 comprises the operating coil 10a and the switches 10b and 10c, both biased to open position.

Relay 11 comprises the operating coil 11a, the switch 11b, biased to open position, and the switch 11c, biased to closed position.

Relay 12 comprises the operating coil 12a, the switch 12b, biased to open poistion, and the switch 12c, biased to closed position.

Relay 13 comprises the operating coil 13a, the switch 13b, biased to open position, and the switch 13c, biased to closed position.

Relay 14 comprises the operating coil 14a and the switch 14b biased to open position.

Relay 15 comprises the operating coil 15a and the switch 15b biased to open position.

Relay 16 comprises the operating coil 16a and three switches 16b, 16c and 16d, all biased to open position.

Relay 17, which is a time delay relay, comprises the operating coil 17a and the switch 17b biased to closed position.

Relay 18, which is a time delay relay, comprises the operating coil 18a and the switch 18b biased to open position.

Referring now to controller 19, said controller includes the arm 20, which, as noted above, is adapted to be motor driven. Said arm 20 carries a plurality of contacting shoes 21, 22, 23, 24, 25 and 26, which are electrically connected together, though insulated from the driving shaft which operates the arm 20. Said shoes 23 and 24 are adapted to engage the elongated segments 27 and 28, respectively. The shoe 22 is adapted, when the arm 20 is at its extreme position in a counter-clockwise direction, to engage the button 22a. The shoe 21 is adapted to successively engage the buttons 21a, 21b, 21c, 21d, 21e, 21f, 21g, 21h, 21i and 21j. The shoe 25 is adapted to successively engage the buttons 25a, 25b, 25c, 25d, 25e, 25f, 25g, 25h, 25i and 25j. The shoe 26 is adapted to successively engage the buttons 26a, 26b, 26c, 26d, 26e, 26f, 26g, 26h, 26i and 26j.

Of the contact buttons above mentioned, 21a, 21c, 21e, 21g and 21i are all electrically connected together through the conductor 21k. Contact buttons 21b, 21d, 21f, 21h and 21j are all electrically connected together through the conductor 21l. Buttons 25a, 25c, 25e, 25g and 25i are all electrically connected together by means of the conductor 25k. Buttons 25b, 25d, 25f, 25h and 25j are electrically connected together by means of the conductor 25l.

The numeral 29 indicates a bus bar, which will be termed herein a first dump bus, while the numeral 30 indicates a bus bar which will be termed herein a second dump bus. Said bus bars 29 and 30 are adapted to be selectably connected to the contact buttons 26b, 26c, 26d, 26e, 26f, 26g, 26h, 26i and 26j through a plurality of double throw selector switches 26l, 26m, 26n, 26o, 26p, 26q, 26r, 26s and 26t.

The arm 20 is rotated in a clockwise direction or a counter-clockwise direction by means of a motor 31, which motor has the armature 31a and two series field windings 31b and 31c. Said series field winding 31b is energized when it is desired to move the arm 20 in a forward direction, that is—a clockwise direction as the parts are viewed in Figure 2. Series field winding 31c is energized when it is desired to move the arm 20 in a counter-clockwise direction.

The motor P for controlling the operation of the four-way valve M, which controls the small bell operating cylinder H, is provided with the armature Pa, the forward series field winding Pb and the reverse series field winding Pc. Said field windings Pb and Pc are adapted to be alternatively energized. When it is desired to move the four-way valve M to the position for causing the raising of the cylinder H to open the small bell A, series field winding Pb will be energized. When it is desired to move the four-way valve M to the position for causing the lowering of the cylinder H to close the small bell A, the series field winding Pc will be energized.

The motor Y for operating the four-way valve W cooperatively associated with the large bell operating cylinder R is provided with the armature Ya, the forward series field winding Yb and the reverse series field winding Yc. When it is desired to move the four-way valve W to position to cause the raising of the cylinder R, thereby opening the large bell B, the series field winding Yb will be energized. When it is desired to move the four-way valve W to cause the lowering of the cylinder R to close the large bell B, the series field winding Yc will be energized.

Various limit switches are employed in the illustrated embodiment of the present invention. Cooperatively associated with the small bell operating cylinder H are nine limit switches, indicated by the numerals 32, 33, 34, 35, 36, 37, 38, 39 and 40. Said limit switches are adapted to be operated by the abutment 41 movable with the cylinder H. Of the limit switches mentioned, 32, 33 and 34 are adapted to be closed by the abutment 41 at the lower extremity of the movement of the cylinder H. Limit switches 35 and 36 are adapted to be closed after the cylinder H has been lifted a predetermined distance. Limit switches 37 and 38 are adapted to be closed when cylinder H has been lifted to a higher level, and limit switches 39 and 40 are adapted to be closed when the cylinder H is at the upper limit of its range of movement.

The large bell operating cylinder R has cooperatively associated therewith four limit switches 42, 43, 44 and 45, all of which are biased to open position and adapted to be closed by means of an abutment 46, movable with cylinder R. Said limit switch 42 is adapted to be closed when the cylinder R is at the lower limit of its range of movement. Limit switches 43 and 44 are adapted to be closed when said cylinder R is in a mid position of its range of movement, and limit switch 45 is adapted to be closed when the cylinder R is at the upper limit of its range of movement.

The crank Q for operating the four-way valve M has cooperatively associated therewith four limit switches 47, 48, 49 and 50, of which limit switch 47 is biased to closed position, limit switch 48 is biased to open position, limit switch 49 is biased to closed position and limit switch 50 is biased to closed position. Said crank Q is provided with an abutment means adapted to move said limit switches 47, 48, 49 and 50 from their biased to their unbiased positions.

The motor Y cooperatively associated with the four-way valve W, which controls the large bell operating cylinder R, has cooperatively associated therewith four limit switches 51, 52, 53 and 54, of which limit switch 51 is biased to closed position, limit switch 52 is biased to open position, limit switch 53 is biased to closed position and limit switch 54 is biased to open position. Said crank Z is provided with an abutment means for moving said limit switches 51, 52, 53 and 54 from their biased to their unbiased position.

The numerals 55 and 56 represent the two mains of an electric circuit. Connected across said mains is a circuit including the skip controller 60, the switch 3e, switch 2c and starting switch 57, which leads to two parallel circuits, one of which includes the switch 58 biased to open position but which is held closed by mechanism which forms no part of this invention during the ascent of the upgoing skip to slow-down position. The other of said two parallel circuits includes the limit switch 34, which is biased to open position, and the switch 17b of the relay 17, which switch 17b is biased to closed position. Said parallel circuits lead to the switch 59, which is biased to closed position but is held open while the revolving top ZA is operating. The means for holding open the switch 59 forms no part of the present invention and need not be described herein, inasmuch as means suitable for the purpose are well known to those skilled in the art. Said switch 59 is connected to the main 56. It will be apparent that the operation of the skip controller is dependent upon the operation of the starting switch 57. Moreover, said skip controller cannot operate until the switch 2c of the relay 2 is moved to its closed position. Moreover, inasmuch as the switch 58 is open except during the ascent of a skip to slow-down position, the skip controller 60 cannot operate except when the limit switch 34 is closed, that is—except when the small bell operating cylinder H is down and the small bell A is in closed position. At the time referred to, the switch 17b of the relay 17 is closed, being biased to closed position.

Connected in parallel across the circuit of the switch 3e and switch 2c is a circuit including the operating coil 1a of relay 1 and the switch 2f of the relay 2. Connected across the mains 55 and 56 is a circuit including the operating coil 2a of relay 2 and the switch 1c of relay 1. Also connected across the mains 55 and 56 is a circuit including the switch 12c of the relay 12, switch 11c of relay 11 and the operating coil 15a of relay 15. The circuit referred to leads to a pair of parallel circuits, one of which includes the switch 5d of relay 5 and the other of which includes, in series with one another, the switch 7d of relay 7 and switch 6c of relay 6. Said two parallel circuits lead to the switch 8f of relay 8, limit switch 33 and limit switch 42. Said limit switch 42 is connected to the switches 1d and 3c, which are arranged in parallel with each other, the other sides of said switches being connected to the main 56. Also connected across the mains 55 and 56, by means of the parallel circuits including switches 1d and 3c, is the operating coil 17a of the relay 17. Said relay 17, as above noted, is a time delay relay and has the function of delaying the opening of the switch 17b until the switch 58 has had ample opportunity to close.

Also connected across the mains 55 and 56 is a circuit including the armature Pa of the motor P, the forward series field winding Pb thereof, the limit switch 49 and the switch 15b of the relay 15.

Also connected across the mains 55 and 56 is a circuit including the trip coils 3b and 1b of the relays 3 and 1, respectively, which trip coils 3b and 1b are connected in parallel with one another. Said two parallel circuits are connected through the limit switch 40 to the main 56.

Also connected across the mains 55 and 56 is a circuit including the operating coil 18a of the relay 18 and the limit switch 39. As noted above, said relay 18 is a time delay relay.

Connected in parallel relationship with the circuit including the series field winding Pb, limit switch 49 and switch 15b is a circuit including the reverse series field winding Pc of the motor P, the limit switch 47 and the switch 18b of the time delay relay 18.

The connections involving the controller 19 will now be described. Connected across the mains 55 and 56 is a circuit which includes the segment 27, shoe 23, arm 20, shoe 21 and either conductor 21k or 21l, depending upon the particular button engaged by the shoe 21. Said conductors 21k and 21l are connected to the operating coils 11a and 12a of relays 11 and 12, respectively, the other sides of said operating coils being connected through the limit switches 37 and 38, respectively, to the main 56. Disposed in parallel relationship with the limit switch 37 is the switch 11b of relay 11. Disposed in parallel relationship with the limit switch 38 is the switch 12b of relay 12.

Also connected across the mains 55 and 56 is another circuit, starting with the segment 27, which extends through the arm 20, shoe 25 and either conductor 25k or 25l, depending upon which button is engaged by the shoe 25. Said conductors 25k and 25l are connected to the operating coils 9a and 10a of relays 9 and 10, respectively. Said operating coil 9a is connected through the switch 9c of relay 9 to the main 56. The operating coil 10a of relay 10 is connected through the switch 10c of relay 10 to the conductor 56. The numeral 61 indicates a circuit extending from a point between the operating coil 11a of relay 11 and the limit switch 37 to a point between the operating coil 9a and the switch 9c of relay 9. Said circuit 61 includes the limit switch 50 and the limit switch 35. The numeral 62 indicates a circuit extending from a point between the operating coil 12a of relay 12 and the limit switch 38 to a point between the operating coil 10a and the switch 10c of relay 10. Said circuit 62 includes the limit switch 48 and the limit switch 36.

Also connected across the mains 55 and 56 is a circuit including switches 9b and 10b in parallel, said switches being connected to the forward series field winding 31b of the motor 31, which motor, as noted above, drives the arm 20 of the controller 19. The circuit referred to also includes the armature 31a of said motor 31.

The circuits for controlling the connections of the first dump bus will now be described. Starting with the main 55, circuit may be traced through the segment 27, shoe 23, arm 20, to the shoe 26. Let it be assumed that one of the double throw switches of the series 26l to 26t has been closed upon the first dump bus 29. Assuming that the shoe 26 is in contact with a button connected to the closed double throw switch referred to, circuit may be traced from said shoe 26 through said closed switch to the first dump bus 29. Said first dump bus 29 is connected through the operating coil 5a of relay 5 and the switch 6e of relay 6 to the main 56. Said first dump bus 29 is also connected through the switch 4d of relay 4, switch 8e of relay 8, limit switch 53 and operating coil 16a of relay 16 to the main 56. Said first dump bus 29 is also connected through the operating coil 4a of relay 4, switch 7e of relay 7 and switch 16b of relay 16 to the main 56. The numeral 63 indicates a maintaining circuit for the operating coil 16a connected on one side to the main 55 and on the other side to a point between the switch 8e and the limit switch 53. Said circuit 63 is a maintaining circuit and includes the switch 16d of relay 16.

The next circuit in order in the diagram shown in Figure 2 is the circuit for operating the valve for controlling the large bell A. Said circuit is connected across the mains 55 and 56 through the armature Ya and the forward series field winding Yb of the motor Y for moving the four-way valve W to a position to cause the lifting of the cylinder R and the consequent opening of the large bell B. The circuit referred to includes the limit switch 32 and the switch 16c of relay 16. Said armature Ya of the motor Y is also connected to the main 56 through the reverse field winding Yc of the motor Y, the limit switch 51 and the limit switch 45.

Also connected across the mains 55 and 56 is a circuit including the switch 5c of relay 5, the operating coil 6a of relay 6, limit switch 52 and limit switch 44. Bridged across the circuit of the switch 5c and operating coil 6a is a circuit 64, which includes three trip coils 5b, 6b and 7b in parallel with one another, which trip coils are connected to the switch 7c of relay 7.

The circuits for controlling the connections of the second dump bus 30 will now be described. Circuit may be traced from the main 55 through the segment 27, arm 20 and shoe 26. Let it be assumed that one of the double throw switches of the series 26l to 26t, inclusive, has been closed upon the second dump bus 30. Assuming that the shoe 26 is in contact with a button connected to the closed double throw switch referred to, circuit may be traced from said shoe 26 through said closed switch to the second dump bus 30. Said first dump bus 30 is connected through the operating coil 14a of relay 14 to the main 56. The numeral 65 indicates a circuit connected on one side to a point between the switch 8e of relay 8 and the limit switch 53 and on the other side to a point between the second dump bus 30 and the operating coil 14a. Said circuit 65 includes the switch 14b of relay 14. The second dump bus 30 is also connected to the main 56 through the operating coil 7a of relay 7. Said second dump bus 30 is also connected to the main 56 through the operating coil 8a of relay 8, limit switch 54 and limit switch 43.

The circuits involving the segment 28 of the controller 19 will now be referred to. Circuit may be traced from the main 55 to the segment 27 and arm 20 to the shoe 24. When said shoe 24 is in engagement with the segment 28, circuit may be traced through the operating coil 13a of relay 13 and the switch 8d of relay 8 to the main 56. The numeral 66 indicates a circuit, one side of which is connected to the main 55 and the other side of which is connected to a mid point between the operating coil 13a and the switch 8d. Said circuit 66 includes the trip coil 4b of relay 4.

Connected to the main 55 is a circuit including the switch 13b of relay 13 and the reverse series field winding 31c of the motor 31, which operates the arm 20 of the controller 19. Circuit may be traced from said reverse field winding 31c through the armature 31a of said motor 31 to the main 56. It should be noted at this time that when the arm 20 has been moved in a counter-clockwise direction, by means of the circuit just described, to a predetermined region, the shoe 24 will ride off the extremity of the segment 28, breaking said circuit and stopping the motor 31, whereby the arm 21 will be stopped in the position shown in Figure 2.

Another circuit may be traced from the main 55 through the segment 27, shoe 23, shoe 22 to the button 22a, which button is engaged when the shoe 24 passes from the extremity of the segment 28. Circuit may be traced from the abutment 22a to the switch 6d of relay 6, switch 13c of relay 13, switch 8c of relay 8, trip coil 8b of relay 8 and switch 4c of relay 4, to the main 56.

The drawings in this case indicate a two-skip charging system. When one of said skips is at the top of its travel and has dumped, the other of said skips should be pulled up. Inasmuch as said skips are connected together by means of a cable, the pulling up of said other skip results in the lowering of the first mentioned skip. For controlling the hauling up of said other skip, the following circuit is provided. Leading from the main 55 is a circuit including the switch 2d of relay 2, the operating coil 3a of relay 3 and starting switch 67. Connected to the starting switch 67 are the two parallel circuits referred to above in connection with the starting switch 57, said two parallel circuits including on the one side the limit switch 58 and on the other side the limit switch 34 and the switch 17b of relay 17. Said parallel circuits are connected through the switch 59 to the main 56. Connected across the mains 55 and 56 is the circuit including trip coil 2b of relay 2 and the switch 3d of relay 3. The numeral 68 indicates a circuit leading from a point between the skip controller 60 and the switch 2c to a point between the operating coil 3a and the starting switch 67. Said circuit 68 includes the switch 2e of relay 2 and the switch 1e of relay 1.

The mode of operation of the above described instrumentalities is substantially as follows:

Let it be assumed that the small bell A is in closed position, which means that the limit switch 34 is closed and that the revolving top ZA is stationary which means that the switch 59 is in closed position. At this time the switch 17b, being biased to closed position, is closed. When the operator closes the starting switch 57, he will complete a circuit from the main 55 through operating coil 1a, switch 2f (closed at this time), through starting switch 57, limit switch 34, switch 17b, switch 59, to the main 56. Energization of the operating coil 1a of latch relay 1 results in the closure of switch 1c of said relay 1, thereby energizing the operating coil 2a of latch relay 2, resulting in the closure of the switch 2c of relay 2. At this time, therefore, a circuit is complete from the main 55 through the skip controller 60, through the switch 3e of latch relay 3, switch 2c of latch relay 2, starting switch 57, limit switch 34, switch 17b and switch 59 to the main 56. Energization of the skip controller 60 results in the operation of instrumentalities (not shown) for hoisting the skip ZE, which happens to be at the bottom of the skip incline ZF.

As indicated above, the switch 58 is biased to open position, but is held closed, by mechanism which forms no part of the present invention, until the ascent of the upgoing skip to slow-down position. When the skip controller 60 is energized, the switch 58 (biased to open position) is closed and is held closed during the ascent of the upgoing skip to the first slow-down point, at which time said switch 58 is caused to open. The instrumentalities for controlling said switch 58 in the manner described are not illustrated, inasmuch as they form no part of the present invention and are available to those skilled in the art. The closure of switch 58 completes a circuit in parallel to the limit switch 34 and the switch 17b. Therefore, when the limit switch 34 opens (as will be described presently) the circuit of the skip controller 60 is still maintained.

Energization of the operating coil 1a of latch relay 1 as above described resulted in the closure of the switch 1d of said relay 1. This closes a circuit across the mains 55 and 56 of the operating coil 17a of the time delay relay 17. After the lapse of a predetermined length of time, energization of said operating coil 17a will cause the opening of the normally closed switch 17b of the relay 17. By reason of the delayed action of the switch 17b, the parts are protected against danger in the event that the small bell A did not operate, as for example in the event of failure in the air supply. Even in the event of any such failure, said time delay switch 17b will operate before the ascending skip gets to first slow-down position. Inasmuch as the switch 58 is opened at slow-down position, circuit through the controller 60 is certain to be broken at said first slow-down position in the event that the small bell A has not operated. Furthermore, in the event that the small bell A has operated but has not reached closed position by the time the ascending skip reaches first slow-down position, circuit will be incomplete through the limit switch 34 at the time that the ascending skip reaches slow-down position, and therefore both of the parallel circuits (including on the one side the switch 58 and on the other side the limit switch 34 and switch 17b) will both be open and the skip controller will be deenergized, whereby the movement of the skips will be stopped. It may also be stated that if at the time the starting switch 57 is closed the revolving top ZA is in motion, circuit will be incomplete through the switch 59 and the skip controller will be deenergized and therefore inoperative to cause the operation of the skips.

Assuming normal conditions, the skip controller will operate to cause the lifting of the upgoing skip to the top of the incline ZD, resulting in the dumping of the ascending skip. The ascending skip is held in dumping position by means of instrumentalities not shown and which form no part of the present invention.

Simultaneously with the energization of the skip controller 60, mechanism is energized for operating the small bell A. As stated above, energization of the operating coil 1a of latch relay 1 has caused the closure of switch 1d thereof, causing the energization of the operating coil 17a of time delay relay 17. Assuming that the small bell operating cylinder H and the large bell operating cylinder R are both in their lowermost positions corresponding to closed positions of the small bell A and large bell B, respectively, and assuming also that the switches 12c and 11c of the relays 12 and 11, respectively, are in closed positions (which would be true in case the arm 20 of the face plate controller 19 has been moved in its step-by-step movement following an operation of the small bell, as will be described,) circuit may now be traced from the main 55 through the switch 12c of relay 12, switch 11c of relay 11, operating coil 15a of relay 15, through the switch 5d of relay 5 (biased to closed position), switch 8f or relay 8 (biased to closed position), limit switch 33 (closed in response to the small bell operating cylinder H), limit switch 42 (closed in response to large bell operating cylinder R), and switch 1d of relay 1 (closed as above described). Completion of the circuit just traced results in the energization of the operating coil 15a of relay 15, causing the closure of the switch 15b of said relay 15. Circuit is now complete from the main 55 through the armature Pa of the motor P, series field winding Pb for forward operation of said motor P, the switch 49, switch 15b to the main 56. The motor P will now be energized to operate the crank Q to operate the valve M. Said valve M will therefore be controlled to provide communication from the air inlet N through the port K to the space at the upper region of the small bell operating cylinder H. Said small bell operating cylinder H will therefore lift, allowing the small bell A to open. When said crank Q has moved to a predetermined position it will open the limit switch 49, breaking the circuit of said motor P. Said crank Q will remain in the position to which it has been moved, leaving the valve M in the position referred to.

At this time the arm 20 of the face plate controller 19 will be in contact with one of the buttons in the series 21a, 21b, 21c, 21d, 21e, 21f, 21g, 21h, 21i and 21j. Circuit may be traced from the conductor 55 through the segment 27 and arm 20 to one of the buttons mentioned. If said arm 20 happens to be in contact with button 21a, 21c, 21e, 21g or 21i, circuit may be traced to the operating coil 11a of relay 11, whence circuit may be traced through the limit switch 37 to the conductor 56. If said arm 20 happens to be in contact with button 21b, 21d, 21f, 21h or 21j, circuit may be traced from the main 55 through segment 27, arm 20, through one of the buttons mentioned, to the operating coil 12a of the relay 12, whence circuit may be traced through the limit switch 38 to the conductor 56. Said limit switches 37 and 38, though biased to open position, are adapted to be closed by the shoes 41 in the up stroke of the small bell operating cylinder H. Limit switches 37 and 38 are closed only momentarily in the ascent of the small bell operating cylinder H. However, energization of the operating coil 11a or operating coil 12a will cause the closure of the switch 11b or switch 12b, as the case may be. By reason of the closure of the switch 11b or 12b, the circuit will be maintained through either operating coil 11a or operating coil 12a so long as the arm 20 is in contact with a button cooperatively associated with said coils 11a or 12a. Energization of the operating coil 11a results in the opening of the switch 11c of the relay 11, preventing the energization of the operating coil 15a of relay 15 and thereby preventing the closure of the switch 15b and preventing energization of the forward series field winding Pb of the motor P. Expressed in other language, the opening of the switch 11c prevents a second operation of the small bell operating cylinder H until the arm 20 has moved from button 21a, 21c, 21e, 21g or 21i to button 21b, 21d, 21f, 21h or 21j, respectively. Likewise, energization of the operating coil 12a results in the opening of switch 12c, preventing the energization of operating coil 15a, thereby preventing the closure of the switch 15b and preventing the energization of the forward series field winding 15b until the arm 20 has moved from button 21b, 21d, 21f, 21h or 21j to button 21c, 21e, 21g, 21i or 21a, respectively.

When the small bell operating cylinder H reaches the upper limit of its travel, the shoe 41 closes the limit switch 39, resulting in the energization of the operating coil 18a of the time delay relay 18. Said time delay relay 18 is a delayed action relay, and after the lapse of a predetermined time will cause the closure of the switch 18b thereof. By reason of the time delay characteristics of the relay 18, the small bell operating cylinder H is held at the upper limit of its travel to give the small bell A time to deposit its burden upon the large bell B.

After the lapse of time referred to, circuit is completed from the main 55 through the armature Pa of the motor P, through the reverse series field winding Pc of said motor P, the limit switch 47 biased to closed position, and the switch 18b, to the main 56. The motor P will now be energized to move the crank Q in a clockwise direction as the parts are viewed in Figure 1, resulting in the opening of the limit switch 47, deenergizing the reverse series field winding Pc and stopping the motor P. As indicated above, the crank Q, driven by said motor P, remains in the position to which it has been moved. The movement of the crank Q in a clockwise direction results in the movement of the valve M to a position in which air is admitted to the space at the lower end of the small bell operating cylinder H and exhaust from the space at the upper end of said cylinder, resulting in the descent of said cylinder and the closure of the small bell A. At the time that the operating cylinder H was at the top of its circuit, the limit switch 40 was closed by the shoe 41, resulting in the opening of said limit switch 40, deenergizing the operating coil 1b of relay 1, resulting in the unlatching of said relay 1 and the opening of the switches 1c and 1d. The circuit is now reset for another operation of the starting switch 57 and the skip controller 60. Closure of the limit switch 40 also results in the energization of the trip coil 3b of relay 3, unlatching said relay 3 and opening the switch 3c.

As the small bell operating cylinder H descends, it causes limit switches 35 and 36 to close momentarily. The closure of limit switch 35 completes a circuit, which may be traced from the main 55 through the segment 27 through the contact 23, the arm 20, contact 25, through the buttons 25a, 25c, 25e, 25g and 25i, through the conductor 25l through coil 9a of relay 9 through limit switch 35 through limit switch 50, which is now closed, since the crank Q is in the closed position, through the contacts 11b of relay 11 to the other side of the main 56. Closure of the relay 9 also closes its contact 9b and contact 9c, providing a maintaining circuit to main 56. Closure of contact 9b completes a circuit from the main 55 through the forward series field winding 31b, through the armature 31a of the motor 31 and to the main 56. Energization of this circuit causes the motor 31 to rotate, moving the contact arm 20 in a clockwise rotation. As soon as the contact 25 on contact arm 20 has moved off the button 25a, the above mentioned circuit will be interrupted. Breaking of this circuit causes the contacts 9b and 9c of the relay 9 to open, resulting in the stopping of the motor 30. Movement of the contact arm 20 also causes contact 21 on the arm 20 to move off the contact button 21a, 21c, 21e, 21g or 21h, as the case may be, causing the circuit to the coil 11a of the relay 11 to be deenergized. Deenergization of this coil causes the opening of the contacts 11b of relay 11.

Should the contact arm 20 be in such a position at the time the small bell operating cylinder H descends that the contacts 21 on the moving arm 20 will be connected with the contact buttons 21b, 21d, 21f, 21h and 21j and the contact 25 connected to the contact buttons 25b, 25d, 25f, 25h and 25j, then, upon the closure of limit switches 35 and 36, a circuit will be established from the line 55 through the segment 27, through the moving arm 20, through the buttons 25b, 25d, 25f, 25h and 25j, through the coil 10a of relay 10 through limit switch 36 to limit switch 48, closed at this time, through contacts 12b of relay 12, which will be also closed at this time, to the mains 56. The result of energizing the coil 10a of relay 10 will cause contacts 10b to close, energizing the motor 31, causing the contact arm 20 to be moved in a clockwise direction.

It will be readily seen from this arrangement that for each descent of the small bell operating cylinder H the contact arm 20 will be caused to move one button. The relays 11 and 9 are operated alternatively with the relays 12 and 10. The travel of the contact arm 20 is such that after having broken contact between the contacts 21, 25 and 26 and the respective buttons, it will move onto the next operating button, thereby being in a position to operate relay 11 or 12 and 9 or 10, as the case may be, on the next descent of the small bell operating cylinder H.

As soon as the small bell operating cylinder H has reached the lowest extremity of its travel, it will cause the closure of limit switches 32, 33 and 34. The circuit is now set for the ascent of a second skip. When the operator closes the starter switch 67, he will complete a circuit from the main 55 through the contacts 21d of the relay 2, closed as described above, through the coil 3a of relay 3, through the starting switch 67, limit switch 34, switch 17b, switch 59, to the main 56. Energization of the operating coil 3a of the latched relay 3 results in the closure of contact 3d of relay 3, thereby energizing the trip coil 2b of relay 2, resulting in the closure of contact 2e of this relay. At this time, a circuit is completed from the main 55 through the skip controller 60, through the contact 2e of relay 2, through the contact 1e of relay 1 (closed at the top of the small bell stroke as previously explained), through the starting switch 67, limit switch 34, switch 17b and switch 59, to the main 56. Energization of the skip controller 60 results in the operation of this control, causing the hoisting of the skip ZE, which happens to be at the bottom of the incline ZF. The operation of the switch 58 will be exactly similar to that described for the hoisting of the first skip. Also the operation of the relays 9, 10, 11, 12, 15 and 18 will also be similar. The result of the operation of these relays will cause the small bell operating cylinder H to descend and remain open a predetermined period, after which it will be allowed to close. The operation of the contact arm 20 will also be as described above, causing the contacts 21, 25 and 26 to be moved ahead one button.

If the contact arm 20 was started in such a position as to make contact with buttons 21a, 25a and 26a when the first skip was operated, it will have been moved ahead one button when the first skip ascended. Upon the ascent of the second skip and the dumping of the small bell operating cylinder H, the contacts 21, 25 and 26 will be making contact with the buttons 21c, 25c and 26c. Since the switch 26m, which is connected to the button 26c, is closed, to make connection with the first dump bus, a circuit will be established at this time, to cause the large bell operating cylinder R to operate. This circuit can be traced from the mains 55, through the segment 27 and contact 23, moving arm 20, contact 26, button 26c, switch 26m, first dump bus 29, contact 4d of relay 4, contact 8e of relay 8, limit switch 53, coil 16a of relay 16, to the line 56. This causes the energization of coil 16a, causing closure of relay 16. A circuit is also completel from the first dump bus 29, through the closing coil 5a of relay 5, through contact 6e of relay 6, to the lines 56. Completion of this circuit causes relay 5 to operate. A circuit is also completed from the first dump bus 29, through the closing coil 4a of relay 4, through contact 7e of relay 7, through contact 16b of relay 16, to the mains 56. This causes relay 4 to open its contacts. Closure of relay 16 closes contact 16d on same, providing the maintaining circuit 63 from the line 56 through contact 16d, through limit switch 53, through coil 16a to the line 56. Closure of relay 16 also causes a completion of a circuit from the line 55 through the armature Ya and forward series field Yb of the motor Y, through limit switch 32 (closed when small bell operating cylinder H is in bottom position), through contact 16c of relay 16 to the line 56. The motor Y will now be caused to operate, and will in turn move the crank Z to operate the valve W. Said valve W will therefore be controlled to provide communication from the air inlet N through the port U to the space at the upper region of the large bell operating cylinder R. Said large bell operating cylinder R will therefore lift, allowing the large bell B to open. When said crank Z has moved to a predetermined position, it will open the limit switch 53, breaking the circuit of said motor Y. Said crank Z will remain in the position to which it has moved, leaving the valve W in the position referred to. The limit switches 43 and 44, though biased to open position and adapted to close by the shoe 45 in the up stroke of the large bell operating cylinder R, are closed only momentarily in the ascent of the large bell operating cylinder R. The operation of limit switches 43 and 44 have no effect on the circuit during the ascent of the large bell operating cylinder R when operated from the first dump bus 29, limit switch 43 being energized from the second dump bus 30, which has not been energized at this part of the cycle. Also, limit switch 44 is in series with limit switch 52, which is also opened by the operation of crank Z. When the large bell operating cylinder R has reached the top of its travel, the shoe 46 is caused to close the limit switch 45. Closure of limit switch 45 completes a circuit from the mains 55 through the armature Ya, reverse series field Yc of the motor Y, through the limit switch 51 (closed by the crank Z), through the limit switch 45 and to the mains 56. Completion of the above mentioned circuit causes the motor Y to be energized to move the crank Z in a clockwise direction as viewed in Figure 1, resulting in the opening of limit switch 51, deenergizing the motor Y and stopping same. As indicated above, the crank Z driven by said motor Y remains in the position to which it has been moved. The movement of the crank Z in a clockwise direction results in the movement of the valve W to a position in which air is admitted to the space at the lower end of the large bell operating cylinder R and exhausts from the space at the upper end of the same cylinder, resulting in the descent of said cylinder and the closure of large bell B.

As the large bell cylinder R descends, the shoe 46 is caused to close limit switches 43 and 44. Limit switch 44 has no effect on the circuit, since it is in series with limit switch 54, which is open at this time. Closure of limit switch 44 completes a circuit from the mains 55 through contact 5c of relay 5 (closed at this time), through closing coil 6a of relay 6, through limit switch 52 (closed when crank Z is in its bottom position), through limit switch 44, to the mains 56, causing relay 6 to open its contacts.

At the completion of the downward stroke of the large bell cylinder R, the shoe 46 causes closure of limit switch 42. Since this limit switch is connected in the circuit of the small bell operating relay 15a, it can readily be seen that it is impossible to start the operation to open the small bell A until the large bell B has been closed. As soon as limit switch 42 has been closed, the operator may again send up another skipload of material by operating the starting switch 57. The circuits controlled will be exactly similar to those explained heretofore, causing the skip ZE to ascend on the incline ZF, and also causing the small bell operating cylinder H to open the small bell A and close same. The operation of the small bell operating cylinder H will cause the moving arm 20 to again move in a clockwise direction, making contact between the contacts 21 and button 21d, the contact 24 and button 25d, and contact 26 and button 26d. Since the switch 26n is connected to make contact with the second dump bus 30, a circuit will be established when the contact 26 on the moving arm 20 reaches the button 26d. This circuit may be traced to the main 65 through the segment 27, through the arm 20, contact 26 and button 26d, through the switch 26n, through the second dump bus 30, through the closing coil 7a of relay 7 to the mains 56. This causes relay 7 to latch open its contacts. A circuit is also established through the coil 14a of the relay 14 to the mains 56, causing the contacts 14b of relay 14 to close. Closure of these contacts energizes the circuit 65 through limit switch 53 and coil 16a of relay 16 to the mains 56. Closure of relay 16 operates the motor Y in a manner similar to that described above, causing the crank Z to operate the valve W in such a manner as to cause the large bell operating cylinder R to ascend, thereby opening the large bell B. Closure of limit switch 43 operated by the shoe 46 in mid travel of the stroke of the large bell operating cylinder R completes a circuit from the second dump bus 30 through the closing coil 8a of the relay 8, through limit switch 54 (closed since the crank Z is in its uppermost position), to limit switch 43, to the mains 56. Closure of relay 8 latches its contacts open. Limit switch 44 is also caused to close, but with no effect on the circuit at this time. Closure of coil 8a of relay 8 causes this relay to operate and closes contacts 8d and 8c, and also opens contacts 8e and 8f. The opening of contact 8f interrupts the dumping of the small bell operating cylinder H, since it is connected in the circuit of the operating coil 15a. The opening of contact 8e prevents another dump of the large bell operating cylinder R, since it disconnects the coil of relay 16a from the first dump bus. The closure of contact 8d completes a circuit from the line 55 through the segment 27, through contact 23, moving arm 20, contact 24 and segment 28, through the coil 13a of relay 13, through contact 8d of the relay 8 to the line 56. A circuit is also completed from the line 56 through the trip coil 4b of relay 4 through the connection 66, through contact 8d of relay 8 to line 56. Operation of coil 4b causes relay 4 to be tripped to its normal position. Closure of coil 13a closes the contacts 13b of relay 13, completing a circuit from the lines 56 through contact 13b, through the reverse series field 31c, through the armature 31a of motor 31, to the lines 56. The energization of motor 31 causes same to rotate the contact arm 20 in a counter-clockwise direction. The contact arm 20 will travel back to the first contact, at which time the contact 24 will leave the segment 28 and thereby interrupt the circuit of the relay 13, causing same to stop the motor 31 at this time. At the time that the contact arm 20 has reached the first button, the contact 22 on same will make contact with the button 22a. This will complete a circuit through the segment 27 through the contacts 23 and 22, button 22a, contact 6d of relay 6 (which has been closed), contact 13c on relay 13 (which is closed at this time since relay 13 is deenergized), contact 8c of relay 8 (closed at this time), trip coil 8b of relay 8, and contact 4c of relay 4 (closed when relay 4 was tripped) to the mains 56. Should all of the various contacts mentioned above be in normal position, showing that the various relays have functioned in the sequence called for, then the relay 8 will be tripped into its normal position.

When the large bell operating cylinder R reaches the uppermost portion of its travel, the shoe 46 causes limit switch 45 to close. Closure of limit switch 45 again connects the motor Y across the mains 55 and 56, including the armature Ya and the reverse field Yc, and also included in this circuit is limit switch 51. The operation of motor Y causes the air valve W to be reversed, the operation of the motor being stopped by the opening of limit switch 51 at a predetermined point. The large bell cylinder R is caused to descend in a manner similar to that described above. During the descent of the large bell cylinder R, the shoe 46 closes the limit switch 44. Closure of limit switch 44 closes a circuit from the mains 55 through the trip coils 5b, 6b and 7b of the relays 5, 6 and 7, respectively, through the contact 7c of relay 7, closed at this time, through limit switch 52, closed since the crank Z is in its bottom position, through limit switch 44, to the mains 56. Energization of the coils 5b, 6b and 7b causes the relays 5, 6 and 7 to trip into their normal position. Limit switch 43 is also closed simultaneously with limit switch 44. Closure of limit switch 43 has no effect on the circuit at this time.

It will be noted that all relays on the board have returned to their normal positions and also that the contact arm 20 on the face plate has returned to its first position. The charging round has therefore been completed and is in such a position as to be started over again by the operation of the skip starting switch 57 or 67, as the case may be. Should any of the relays not function at their predetermined time, it will be found impossible to dump the small bell when the skip is next operated. This will cause the skip bucket to be held at slow-down until the trouble is investigated and corrected.

Many modifications of the present invention will occur to those skilled in the art. It is intended to cover all such modifications that fall within the scope of the appended claims.

What is claimed is:

1. In a system, in combination, a first operating means, a second operating means, and a controller for said two operating means for automatically causing said two operating means to operate in a predetermined sequence in a round, said controller including selector switches for predetermining the number of operations of said first operating means before and after an operation of said second operating means in a round regardless of the total number of operations of said first operating means before and after an operation of said second operating means.

2. In combination, a first motive means, control means therefor, a second motive means, control means therefor, a controller adapted to actuate said control means in a predetermined sequence, reversible motive means for said controller, and means responsive to the operation of said first-mentioned motive means for energizing said controller motive means for one direction of movement of said controller, and means responsive to an operation of said second motive means for energizing said controller motive means for the opposite direction of movement of said controller.

3. In combination, a first motive means, control means therefor, a second motive means, control means therefor, a controller adapted to actuate said control means in a predetermined sequence, reversible motive means for said controller, and means responsive to the operation of said first motive means for energizing said motive means for said controller, said controller being provided with a plurality of selector switches for predetermining the number of operations of said first-mentioned motive means before and after an operation of said second motive means regardless of the total number of operations of said first motive means before and after an operation of said second motive means.

4. In combination, a first motive means, control means therefor, a second motive means, control means for said second motive means, sequence means for connecting the control means for said second motive means in circuit across a source of E. M. F., said sequence means including a controller and a plurality of selector switches for predetermining the action of said controller, reversible actuating means for said controller, and means responsive to operation of said first motive means for energizing said actuating means for one direction of movement of said actuating means, and means responsive to an operation of said second motive means for energizing said actuating means for the opposite direction of movement of said actuating means.

5. In combination, a first motive means, control means therefor, a second motive means, control means for said second motive means, sequence means for connecting said second motive control means in circuit across a source of E. M. F., said sequence means including a controller, said controller including a plurality of contacts and a switch member for successively engaging said contacts, and reversible actuating means for said controller, said actuating means being responsive to operations of said first motive means for one direction of movement and responsive to an operation of said second motive means for the opposite direction of movement.

6. In combination, a first motive means, control means therefor, a second motive means, control means for said second motive means, sequence means for connecting the control means for said second motive means in circuit across a source of E. M. F., said sequence means including a controller, said controlller including a plurality of contacts and a switch member for successively engaging said contacts, and reversible actuating means for said controller, said actuating means being responsive to operations of said first motive means for one direction of movement and responsive to an operation of said second motive means for the other direction of movement, said sequence means also including a plurality of selector switches for predetermining the connections through said controller for the control means for said second motive means.

7. In combination, a first motive means, control means therefor, a second motive means, control means for said second motive means, a controller, reversible actuating means for said controller, means responsive to said first motive means for actuating said controller in a step-by-step movement in one direction, selector switches cooperatively associated with said controller, and connections for energizing said second motive means after a predetermined number of operations of said first motive means and actuating said controller in a movement in the reverse direction after a predetermined number of operations of said second motive means.

8. In combination, a first motive means, control means therefor, a second motive means, control means therefor, a controller having a plurality of contacts, a switch member adapted to engage said contacts successively, reversible actuating means for said switch member responsive to operations of said first motive means, selector switches for grouping said first-mentioned contacts in predetermined groups, and connections including said switch member between said second motive means and said selector switches for energizing said second motive means after a predetermined number of operations of said first motive means and actuating said controller in a movement in the reverse direction after a predetermined number of operations of said second motive means.

9. In combination, a first motive means, control means therefor, a second motive means, control means for said second motive means, seqeunce means for predetermining an automatic cycle of operations of said first motive means before and after an operation of said second motive means, said sequence means including a controller, reversible actuating means for said controller for communicating a step-by-step movement thereto in one direction in response to operations of said first motive means, and selector switches cooperatively associated with said controller for causing the energization of said second motive means at a predetermined point between the operations of said first motive means and actuating said controller in a movement in the reverse direction after a predetermined number of operations of said second motive means.

10. In combination, a first weight means, control means for causing the raising of said weight means, a second weight means, control means for causing the lifting of said second weight means, a controller for controlling the operation of said two control means, reversible actuating means for said controller for communicating a step-by-step movement thereto in response to operations of said first weight means, and selector switches cooperatively associated with said controller for predetermining the number of operations of said first weight means before and after an operation of said second weight means regardless of the total number of operations of said first weight means before and after an operation of said second weight means.

11. In a system, in combination, a first operating means, a second operating means, a controller for controlling said operating means to cause said operating means to operate according to predetermined cycles, said controller being provided with a plurality of selector switches for locating an operation of said second operating means intermediate of the operations of said first operating means regardless of the total number of operations of said first operating means, and interlocking means for preventing said first operating means from again operating after it has completed a predetermined sequence of operations until said second operating means has completed its cycle of operation.

ARTHUR J. WHITCOMB.